J. T. CROCKER.
SPRING WHEEL.
APPLICATION FILED SEPT. 7, 1915.

1,209,940.

Patented Dec. 26, 1916.

Witnesses
Edw. S. Hall

Inventor
Jacob T. Crocker
By Richard S. Owen

UNITED STATES PATENT OFFICE.

JACOB T. CROCKER, OF LONELM, ARKANSAS.

SPRING-WHEEL.

1,209,940.  Specification of Letters Patent.  Patented Dec. 26, 19..

Application filed September 7, 1915. Serial No. 49,356.

*To all whom it may concern:*

Be it known that I, JACOB T. CROCKER, a citizen of the United States, residing at Lonelm, in the county of Franklin and State of Arkansas, have invented certain new and useful Improvements in Spring-Wheels, forming a continuation in part of application Serial No. 868,127, filed October 22, 1914, of which the following is a specification.

My invention relates to a spring wheel and more particularly to an improved cushioning element therefor and forms a continuation of my pending application Serial No. 868,127.

The primary object of my invention is to provide a cushioning element for vehicle wheels which is simple of structure, cheap to manufacture, strong and durable and effective in operation.

Another object of the invention is to provide means for retaining my improved cushioning element in position on the felly of a vehicle wheel.

Figure 1:
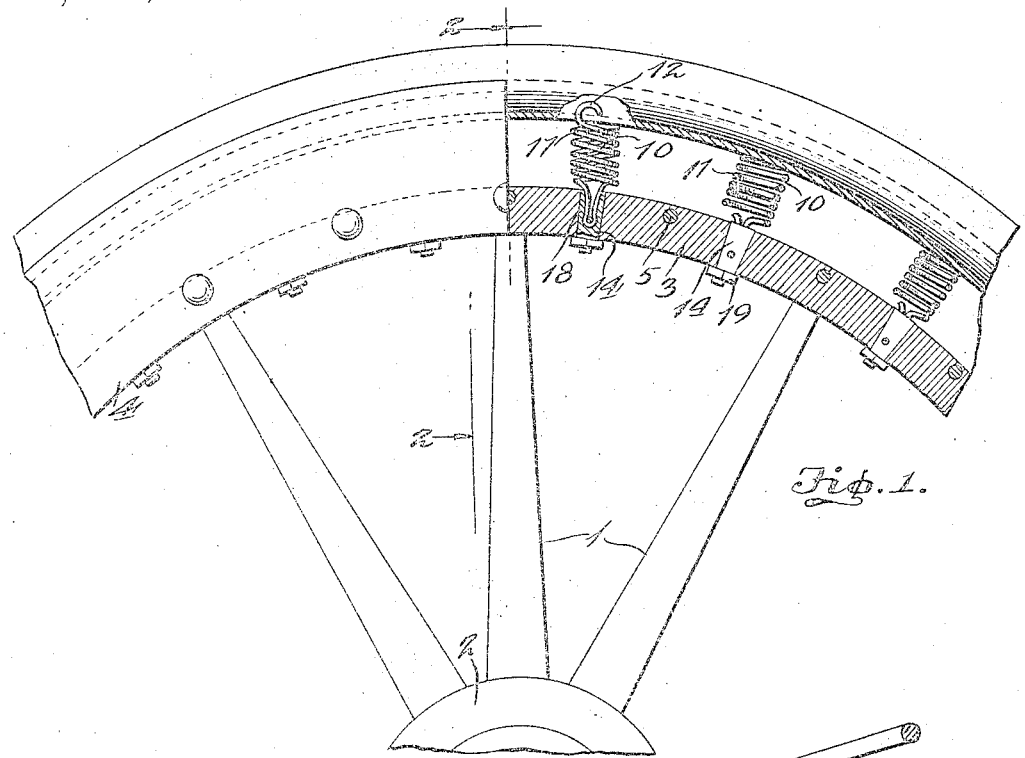
Figure 2:
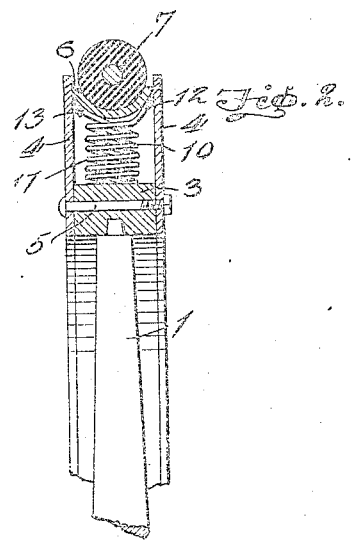
Figure 4:
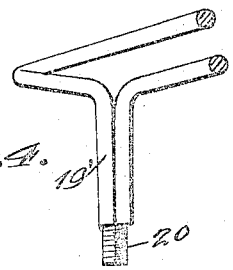
Figure 3:
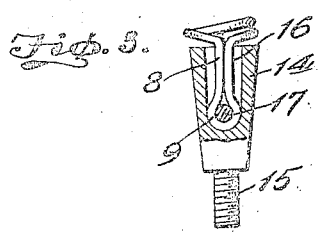

With the above and other objects in view my invention resides preferably in the construction, combination, and arrangement of parts as hereinafter set forth in the specification and illustrated in the accompanying drawings in which:

Figure 1 is a fragmental side elevation partly in section of a vehicle tire constructed in accordance with the improvements of my invention. Fig. 2 is a transverse sectional view taken on the line 2—2 of Fig. 1. Fig. 3 is a detailed sectional view of one form of cushioning element and Fig. 4 illustrates a modified form of the same.

Similar reference characters designate similar parts throughout the various views of the drawings.

In the drawings, wherein the preferred embodiment of my invention is illustrated, the vehicle wheel is shown having the usual spokes 1, hub 2, and felly 3. The felly 3 is provided with a plurality of outwardly extending annular flanges 4, said flanges being secured to the felly by means of transversely extending bolts or the like 5. A tire or tread carrying plate 6 is provided and preferably takes the form of an annulus, being substantially semi-circular in cross section as shown to advantage in Fig. 2. The tread or tire of any desired type 7 is receivable in said carrying plate 6. The annulus 6 is of a diameter slightly less than the outside diameter of the annular flanges 4.

The cushioning element of my invention is interposed between the annulus, hereinafter termed the outer rim, and the felly 3 and comprises a coiled spring element formed from the strand of wire 8 bent substantially intermediate its length to provide a loop 9, and coiled to provide springs 10 and 11 having their convolutions alternately arranged. The outer free extremities of the springs 10 and 11 are curved as indicated at 12 and 13, respectively. The loop portion 9 is receivable in a square tapering block 14 having a threaded shank 15 and a recess 16 to accommodate said loop. A transversely extending rivet 17 or the like is disposed through said loop and anchored to connect the spring firmly therewith. The felly 3 is provided with a plurality of squared apertures 18 to receive said squared blocks 14, and nuts 19 on the threaded shanks 15 serve to prevent accidental displacement of the block.

From an inspection of Fig. 2 it will be noted that the curved extremities of the springs 10 and 11 serve to seat the outer rim 6, said rim being guided in its inward movement by the flanges 4.

In Fig. 4 I have illustrated the modified form of cushioning element. In this form the use of the squared block 14 is obviated, the strand of wire being squared at 19' and provided with threads 20 which are adapted to receive the usual nuts hereinbefore referred to, the cushioning portion of the device is practically identical with the first described form and need not be further dwelt upon. The square portion 19' is adapted to be received within the openings 18 and secured in the same manner as that form of my invention previously described.

From the above description taken in connection with the accompanying drawing it is thought that a clear and comprehensive understanding of the construction, operation and advantages of my invention may be readily gathered, and while I have shown and described my invention as comprising a peculiar form and construction, it is desired that it be understood that I may make such changes in the details thereof which do not depart from the spirit and scope of the invention as claimed.

What I claim is:

1. A vehicle tire, in combination with a felly having annular flanges thereon and a tread carrying outer rim therein, a shock absorbing element for said outer rim including a wire strand bent upon itself and coiled to provide double springs having their convolutions alternately arranged.

2. A cushioning device for vehicle tires including a wire strand bent to form a plurality of coiled springs having their convolutions alternately arranged, the free extremities of said springs being formed with tread receiving portions.

3. A cushioning device for vehicle tires formed of a strand of wire bent upon itself to provide a loop, said strand having portions thereof formed into coiled springs having their convolutions alternately arranged, and means associated therewith for attaching said springs on the felly.

4. A cushioning device, comprising a strand of wire bent to form a loop and coiled to provide springs having their convolutions alternately arranged, a squared tapering block having a recess therein to receive said loop, a threaded shank thereon and a pin extending transversely of said block and through said loop to insure connection of the former with the latter.

In testimony whereof I affix my signature in presence of two witnesses.

J. T. CROCKER.

Witnesses:
  E. S. DUVALL,
  J. F. RANKIN.